May 10, 1927.　　　W. J. MATTERN　　　1,627,797
PIPE

Filed Jan. 26, 1926

Inventor

W. J. Mattern.

By Lacy & Lacy, Attorneys

Patented May 10, 1927.

1,627,797

UNITED STATES PATENT OFFICE.

WILLIAM J. MATTERN, OF LEWISTOWN, PENNSYLVANIA.

PIPE.

Application filed January 26, 1926. Serial No. 83,895.

This invention relates to smoking pipes and more particularly to an improved joint between the mouth-piece of a pipe and the stem portion thereof.

One object of the invention is to so mount the mouth-piece that it may be readily moved into and out of operative relation to the stem to facilitate cleaning of the pipe and when in closed position will form a tight joint at its junction with the stem.

Another object of the invention is to so connect the mouth-piece with the stem that there will be no danger of the mouth-piece becoming broken and a portion thereof remaining in the outer end of the stem as often happens when a threaded stem is used.

Another object of the invention is to provide a coupling for the stem and mouth-piece formed of pivotally connected sections adapted to be firmly seated upon the stem and mouth-piece, respectively, and held against movement longitudinally with respect thereto.

Another object of the invention is to so form the adjacent ends of the stem and mouth-piece that a very tight joint will be formed between the two and leakage prevented which would interfere with proper operation of the pipe.

This invention is illustrated in the accompanying drawing, wherein

Figure 1:
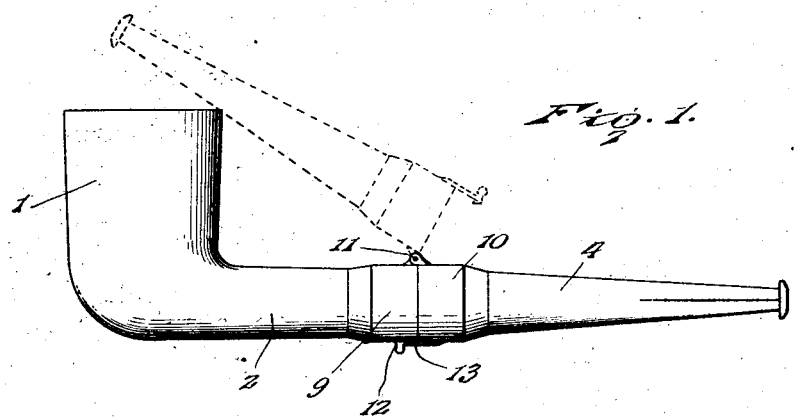
Figure 1 is a view showing the improved pipe in side elevation.

The bowl 1 of the pipe is of a conventional construction and may be of the specific shape illustrated or of a modified form and construction. A stem 2 leads from the bowl and is formed with a smoke passage 3 which in the present illustration communicates with the bottom of the bowl. The mouth-piece 4 which may be formed of amber, hard rubber or any other desired material is adapted for end to end contact with the stem 2 in which position its smoke passage 5 will register with and form a continuation of the smoke passage 3. It is customary at the present time to provide a pipe with a mouth-piece removably connected with the stem of the pipe but in most cases the mouth-piece has a reduced end portion which is threaded and screwed into a threaded socket formed in the end of the stem about the smoke passage thereof. When this construction is employed and the pipe carried in a pocket, the mouth-piece often becomes broken at its reduced and threaded end and this threaded end portion of the mouth-piece remains in the threaded socket of the stem. When so broken, it is very difficult to remove the threaded end portion of the mouth-piece so that a new mouth-piece may be substituted for the broken one.

In order to overcome the objections noted above, the outer end portion 6 of the stem 2 has been tapered to a substantially conical formation, and this conical end portion 6 of the stem is received in a recess 7 formed in the adjacent end of the mouth-piece. A packing 8 of cork, felt or any other soft and compressible material is placed upon the tapered end portion of the stem and it will be readily seen that, when the tapered end portion is held firmly in the recess, the packing will be compressed and an air-tight joint formed so that the pipe will draw properly.

Figure 2:
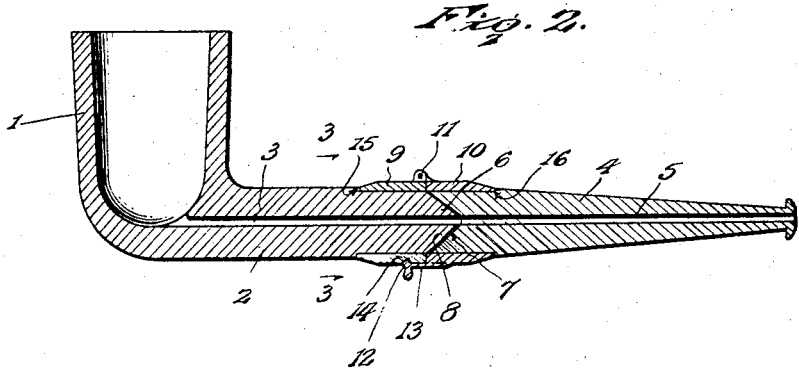
Fig. 2 is a longitudinal sectional view through the pipe.
Figure 3:
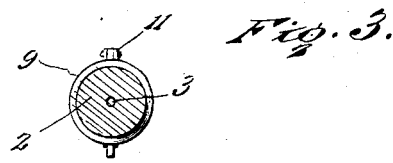
Fig. 3 is a transverse sectional view taken through the stem on the line 3—3 of Fig. 2.

The coupling, by means of which the stem and mouth-piece are connected, consists of sleeves 9 and 10 which fit tightly upon the adjacent end portions of the stem and mouth-piece and are hingedly connected, as shown at 11, so that the mouth-piece may be swung from the operative position shown in Fig. 2 and in full lines in Fig. 1 to an inoperative position, as indicated by dotted lines in Fig. 1. When the mouth-piece is swung to the dotted line position, it may be readily cleaned and the smoke passage of the stem also readily cleaned by passing a pipe cleaner of a conventional construction through the smoke passages 3 and 5. After the smoke passages have been cleaned, the mouth-piece is returned to the normal position and the head 12 of the latch 13 will snap into the recess 14 formed in the sleeve 9 and securely hold the sections against swinging movement away from each other. A certain amount of pressure must be exerted in order to permit the head of the latch to pass into the notch or recess 14 and this pressure will cause the packing 8 to be compressed and a tight joint formed. It should be further noted that the end portions of the stem and mouth-piece upon which the sleeves fit are reduced externally. This reducing of the stem and mouth-piece forms shoulders 15 and 16 against which the sleeves 9 and 10 abut so that, when the mouth-piece is in the operative position, movement of the coupling longitudinally of the stem and mouth-piece will be prevented. By having the mouth-piece connected with the stem in the manner set forth above and clearly illustrated in Fig. 2, it is not necessary to reduce the forward end portion of the mouth-piece and cause it to be weakened and liable to easily break. If, however, the mouth-piece should become broken, the forward end portion may be readily removed from the sleeve 10 and a new one inserted.

Having thus described the invention, I claim:

A smoking device including a stem, a mouth-piece adapted to be disposed in end to end contact with said stem, sleeves fitted tightly about the stem and mouth-piece and hingedly connected to mount the mouth-piece for swinging movement towards and away from the end of the stem, the free end portion of said stem being projected from the sleeve mounted thereon and tapered and the mouth-piece having a portion enclosed by said sleeve recessed to snugly receive the tapered portion of said stem, and a latch carried by one sleeve and adapted to engage the other sleeve and releasably hold the mouth-piece in operative relation to the stem.

In testimony whereof I affix my signature.

WILLIAM J. MATTERN. [L. S.]